United States Patent [19]

Thurber

[11] 4,301,642
[45] Nov. 24, 1981

[54] SAFETY ROTOR FOR MOWER

[76] Inventor: Stephen H. Thurber, 532 E. Campbell Ave., Sherrill, N.Y. 13461

[21] Appl. No.: 120,362

[22] Filed: Feb. 11, 1980

[51] Int. Cl.³ ............................................. A01D 55/18
[52] U.S. Cl. ..................................... 56/12.7; 56/295; 30/276
[58] Field of Search .................. 56/295, 12.7; 30/276, 30/347

[56] References Cited
U.S. PATENT DOCUMENTS

| | | | |
|---|---|---|---|
| 3,708,967 | 1/1973 | Geist et al. | 56/12.7 |
| 3,826,068 | 7/1974 | Ballas et al. | 56/295 |
| 4,145,809 | 3/1979 | Proulx | 30/276 |
| 4,176,508 | 12/1979 | Baumann et al. | 30/276 |

Primary Examiner—Robert A. Hafer
Attorney, Agent, or Firm—Stonebraker, Shepard & Stephens

[57] ABSTRACT

A hollow and generally closed body 10 of a safety rotor fits on the motor shaft 12 of a rotary mower and replaces a conventional mower blade. The diameter of body 10 is from 0.5 to 0.9 times the width of the swath of the mower, and several strands 11 extend far enough outward from body 10 to cut to the full width of the swath. Spools 21 or 72 contained within the body supply the strands, and a holder responsive to centrifugal force prevents strands 11 from moving outward as body 10 rotates. The strands can be automatically replenished by a strand feeder that operates when the mower slows down and speeds up.

22 Claims, 11 Drawing Figures

SAFETY ROTOR FOR MOWER

BACKGROUND

According to the Consumer Product Safety Commission, 77,000 people are hurt each year by rotary lawn mowers. Besides cutting hands or feet with the high speed rotor blade, these mowers can injure people by hurling small objects. Even a careful operator is endangered while using a rotary mower on steep slopes where he might slip into the blade.

To help prevent such injuries, the Commission has recommended that the Federal Government require automatic controls that force the blades to a complete stop automatically within three seconds after the user lets go of the handle. But even this would not stop injuries from hurled objects or from slipping a foot into the blade while holding the handle.

My invention solves the problem of rotary mower injuries by substituting a safety rotor that will not cut flesh or hurl objects and yet cuts grass effectively. My safety rotor can be substituted for the blade on existing lawn mowers and does not require sharpening. It runs slightly quieter than a conventional blade, and is convenient and effective to use.

SUMMARY OF THE INVENTION

My safety rotor uses a hollow and generally closed body having a generally smooth exterior formed to fit on a mower shaft to rotate in place of a conventional mower blade. The circular perimeter of the body has a diameter between 0.5 and 0.9 times the swath of the mower, and strands extending radially outward from the perimeter cut to the full width of the swath. Spools within the body supply and replenish the strands by feeding radially outward, and the strands are held in position during operation. I prefer strand holders responsive to changes in centrifugal force for feeding strands radially outward to replenish strands by slowing down and then speeding up the mower.

DRAWINGS

DETAILED DESCRIPTION

Figure 1:
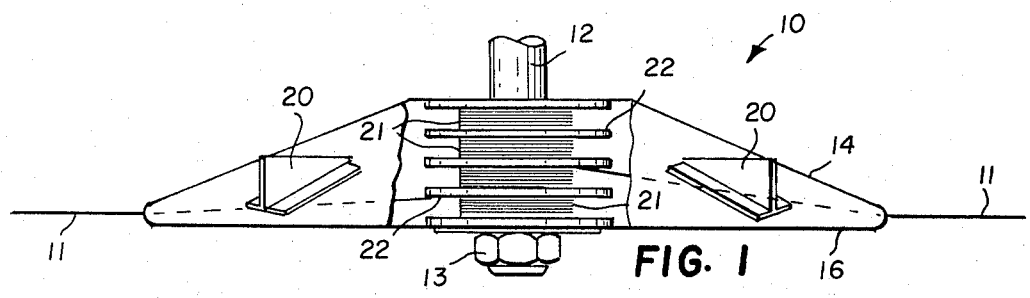
FIG. 1 is a partially cut-away, side elevational view of a preferred embodiment of my safety rotor.
Figure 2:
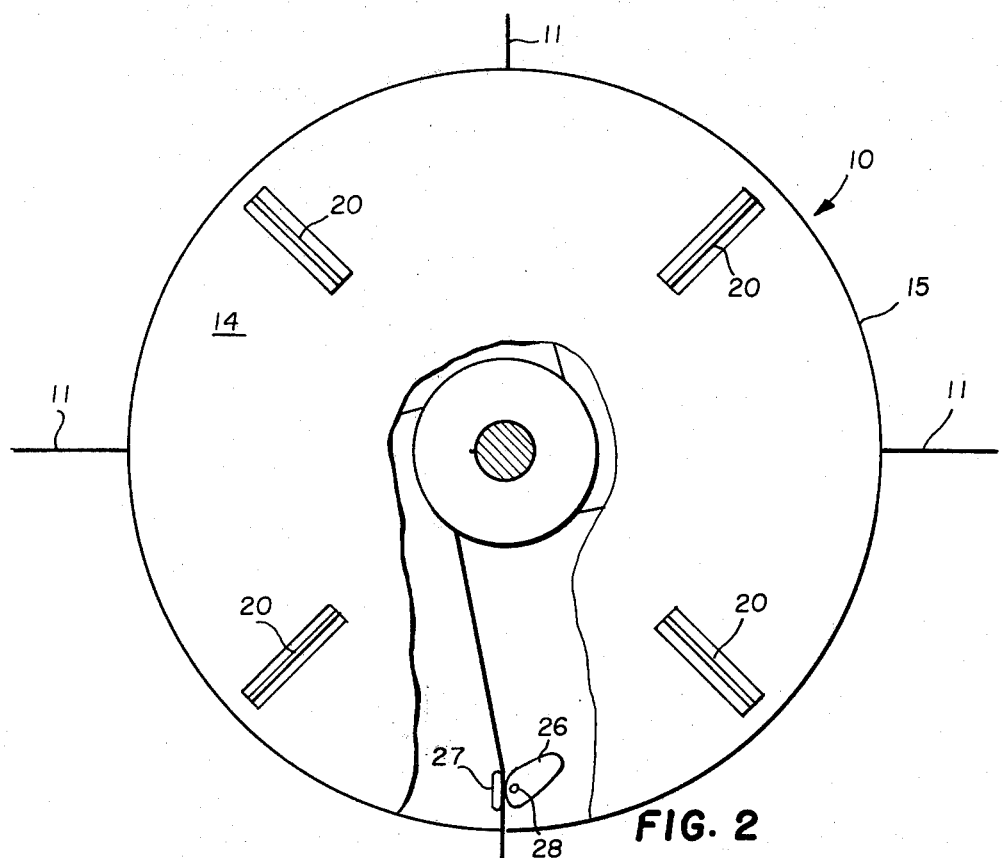
FIG. 2 is a partially cut-away, plan view of the rotor of FIG. 1.

As best shown in FIGS. 1 and 2, my safety rotor is formed as a dish-shaped hollow body 10 having several radial strands 11 that cut the grass. Body 10 has an axial hole allowing it to fit on the shaft 12 of a rotary mower in place of the conventional blade where it can be secured in place by a conventional screw or nut 13. The illustrated configuration of body 10 and strands 11 involves several features that are important for safety and convenience.

Body 10 is generally smooth with a circular perimeter 15, a generally conical or convex upper surface 14, and a generally concave or flat bottom 16. It is desirable for mowing purposes that body 10 pump air radially outward, and flexible fins 20 on upper surface 14 of body 10 accomplish this. Fins 20 are made of a resilient and yielding material such as synthetic rubber or thermoplastic so that they will not throw objects forcefully. Also, the flexibility of fins 20 and the generally smooth and circular surface of body 10 allow a hand or foot to touch body 10 during rotation without being injured.

Body 10 has a diameter of from 0.5 to 0.9 times the width of the swath cut by the mower that drives shaft 12, and this gives body 10 a substantial diameter from which strands 11 extend radially outward. I prefer that strands 11 extend two or three inches from body 10 outward to the full width of the cutting swath so that rotation at present lawn mower speeds drives strands 11 rapidly enough to cut effectively and have a relatively short length that is convenient to manage. Four strands 11 per rotor have proven successful, but different numbers of strands can be used.

Making body 10 hollow and forming it of a lightweight material such as aluminum or resin allows it to have a total mass and rotational resistance approximately equal to a conventional blade so that existing mowers can operate at designed rpm in driving my safety rotor. Hollow body 10 also affords space for supply spools 21 for strands 11. As illustrated, spools 21 can encircle shaft 12 in the center of body 10; and I prefer friction washers 22 between spools 21 to offer some resistance to the uncoiling of strands 11.

Strands 11 are preferably formed of a tough and strong material such as a nylon or other resinous strand. A monofilament is probably best, although I have achieved good results with a braided tennis racket strand. The diameter of strands 11 should be in the neighborhood of a millimeter or two so that they are small enough to cut grass effectively. Presently available lawn trimmers have established that a high speed strand can cut grass; but my arrangement of several strands extending radially from a large, smooth rotor establishes a way that strands can accomplish the complete mowing job and can be applied to existing mowers. My multistranded rotor works well cutting different types of grass, weeds, and even shredding leaves.

I have found that placing bare fingers in the path of rotating strands 11 stings enough so that my hand withdraws quickly, but strands 11 do not cut flesh. Also, rotating body 10 can be touched or run against a shoe without injury.

Figure 3:
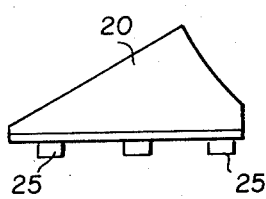
FIG. 3 is a side elevational view of a preferred form of flexible vane for the rotor of FIGS. 1 and 2.
Figure 6:
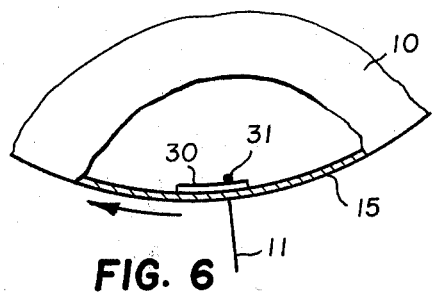
FIG. 6 is a fragmentary and partially schematic plan view of the keyhole pad of FIG. 5 in operation on a rotor.
Figure 4:
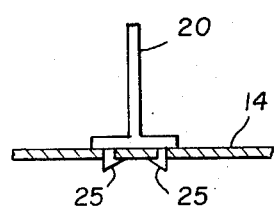
FIG. 4 is an end elevational view of the vane of FIG. 3 anchored on a fragment of the rotor.
Figure 5:
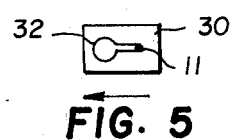
FIG. 5 is a side elevational view of an auxiliary keyhole anchorage for cutting strands.

FIGS. 3 and 4 show a convenient way of attaching flexible fins 20 to body 10 by using snap hooks 25 that fit in openings in upper surface 14 of body 10. This also allows easy replacement of damaged fins.

Strands 11 are held against moving radially outward from centrifugal force and the drag that tends to pull them outward as they move through grass. Several arrangements of brakes and clamps are possible to accomplish this, and the centrifugal clamp 26 shown in FIG. 2 is one preferred alternative. Clamp 26 turns on pivot 28 in response to centrifugal force to grip strand 11 by pressing it against abutment 27.

When body 10 slows to idle speed or stops, clamp 26 loosens or releases, allowing strands 11 to be pulled radially outward for replenishing their length as they wear away. When body 10 resumes speed, clamp 26 automatically engages in response to centrifugal force to hold strands 11 securely during the normal cutting operation.

An auxiliary or alternative way of holding strands 11 on rotor 10 is with a keyhole lock formed of a resilient pad 30 having a keyhole-shaped opening 32 registered with a corresponding keyhole-shaped opening in the perimeter 15 of body 10. A short length of strand 11 having an end 31 that is melted or formed into a ball or head can then be inserted through the large part of keyhole opening 32 and then wedged into the narrow part of keyhole opening 32 where it tends to stay as the rotor turns in a direction so that the narrow part of keyhole 32 trails the wider part. Such an arrangement is less convenient than automatic feed for strands 11 but can be a stopgap measure if an automatic feed system fails.

Figure 7:
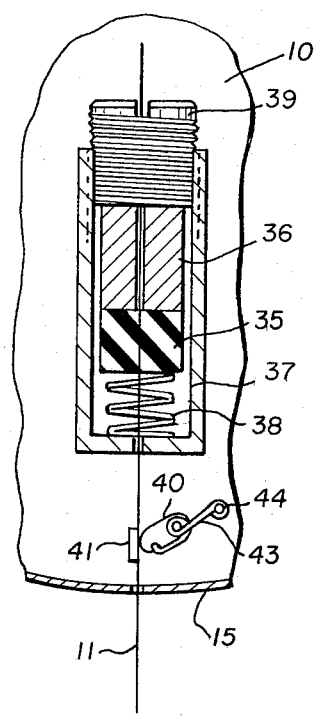
FIG. 7 is a partially schematic, fragmentary plan view of a preferred embodiment of automatic strand feed for the inventive rotor.

FIG. 7 schematically shows a preferred arrangement for an automatic feed for strands 11. A resilient gripper 35 and a weight 36 move radially back and forth within a chamber 37 against the bias of a spring 38 in response to centrifugal force. An adjustable dash pot 39 threaded into the inner end of chamber 37 retards radial movement of weight 36, making it slightly sluggish, and also limits the length of movement. Compression spring 38 biases gripper 35 and weight 36 radially inward, and centrifugal force drives these elements outward. Element 35 is resilient and compressible and has a central bore with a sliding fit on strand 11 so that when compressed against spring 38 by centrifugal force, element 35 deforms and grips strand 11 securely. This occurs as rotational speed increases and gripper 35 begins moving radially outward so that it grips strand 11 and carries it radially outward to automatically feed a replenishing length of strand 11. As rotation slows down and centrifugal force diminishes, gripper 35 moves inward and relaxes its grip on strand 11.

Retainer 40 cooperates with gripper 35 so that strand 11 cannot be pulled radially inward and is free to be fed radially outward, producing automatic strand feed by slowing down the mower and speeding it up again. Retainer 40 turns on pivot 42 against clamping abutment 41 and is biased toward abutment 41 by spring 43. As centrifugal force decreases on deceleration of the mower, spring 43 mounted on pin 44 presses retainer 40 against strand 11 and abutment 41 preventing any radially inward movement of strand 11. This lets gripper 35 slide radially inward without drawing strand 11 along in that direction. As the mower accelerates to increase the centrifugal force, retainer 40 pivots away from abutment 41, releasing strand 11, which is gripped and fed by gripper 35 moving radially outward. Dash pot 39 helps insure that retainer 40 actuates faster than gripper 35 so that these two components cooperate for automatically feeding strand 11.

Figure 8:
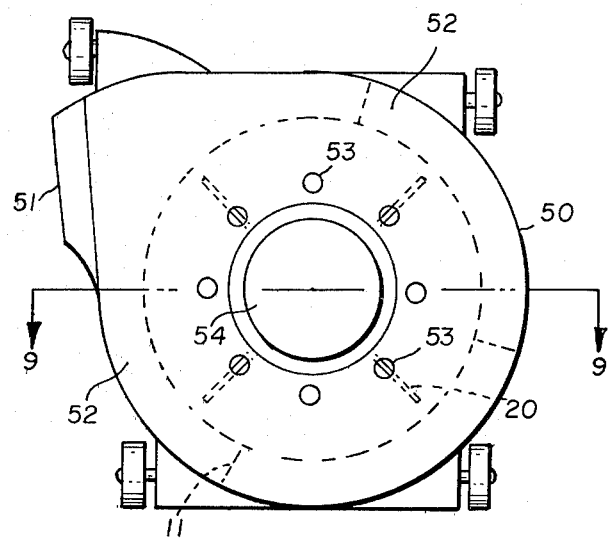
FIG 8 is a plan view of a rotary mower housing formed to cooperate with the inventive rotor.
Figure 9:
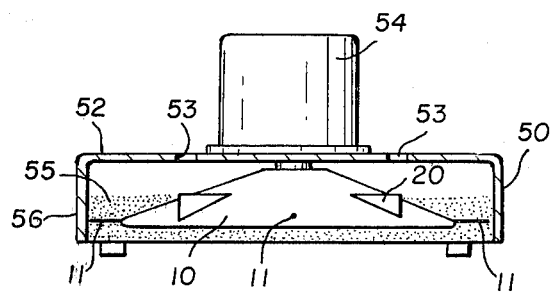
FIG. 9 is a partially cross-sectioned view of the housing and rotor of FIG. 8 taken along the line 9—9 thereof.

FIGS. 8 and 9 schematically show ways that a mower housing 50 can cooperate with safety rotor 10. Fins 20 pump air radially in a swirl within housing 50 to provide a discharge 51 for cut grass, and to facilitate this, the top deck 52 of housing 50 has air inlet holes 53 positioned radially inward of fins 20 to facilitate the radially outward flow and swirl provided by fins 20. Holes 53 are conveniently bored around motor 54 mounted on deck 52.

If an automatic feeding system for strands 11 overfeeds, a simple way of keeping strands 11 trimmed to an appropriate length is by placing an abrasive coating 55 on the inside of the vertical wall 56 of housing 50 around the plane of rotation of strands 11. The ends of strands 11 are then worn off by abrasive coating 55 as they contact the inside of the outer wall 56 of housing 50. A strand feeding system can then be adjusted to overfeed slightly, and strands 11 are automatically trimmed to the proper length by engaging the mower housing. Adjustment in the length of strand replenishment for an automatic strand feeding system can be accomplished as shown in FIG. 7 by adjusting the position of dash pot 39, limiting the radial travel of gripper 35. Other alternatives are also possible, and for a replenishment system responsive to changes in centrifugal force, the operator controls strand replenishment by the frequency of slowing down and speeding up the mower motor.

Figure 10:
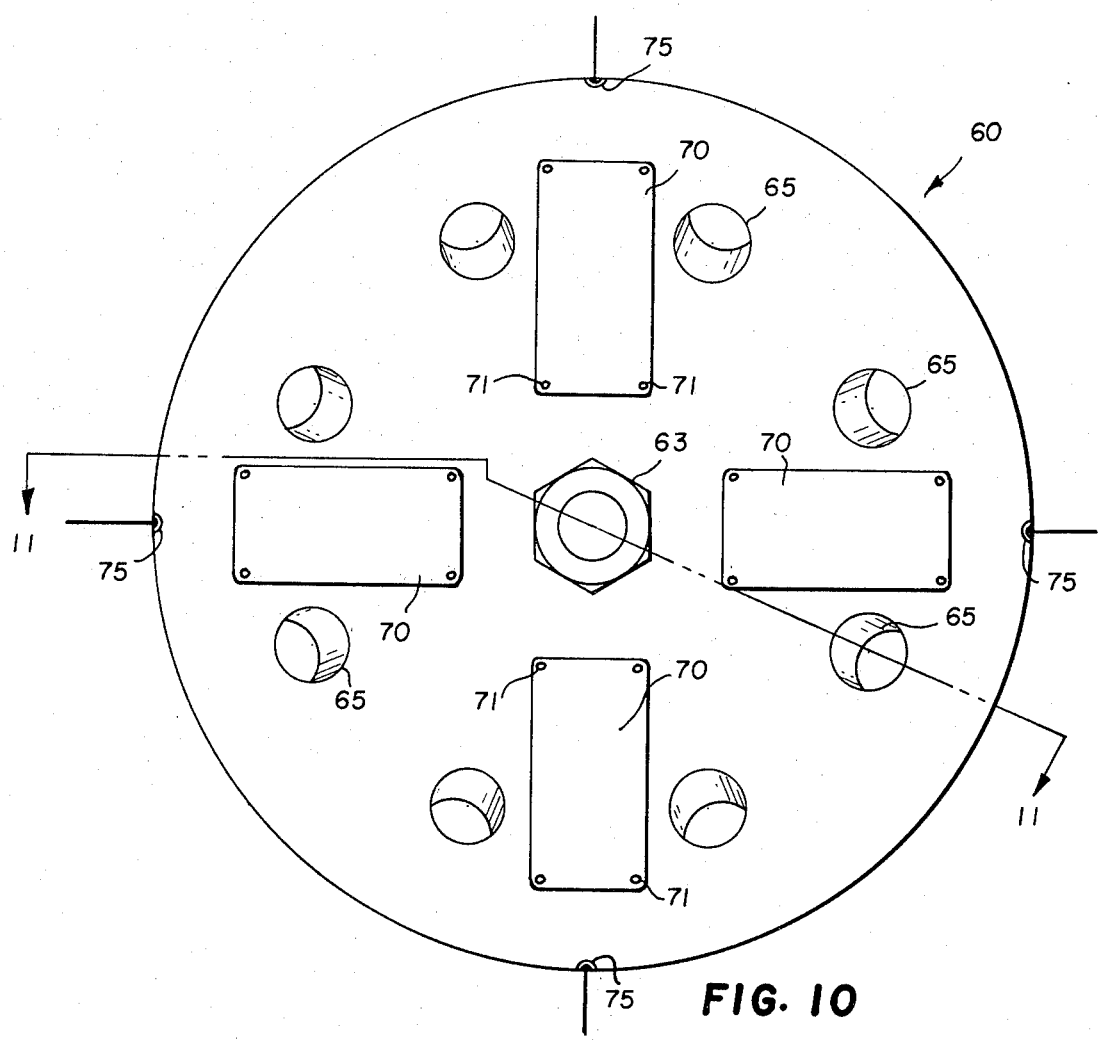
FIG. 10 is a bottom view of another preferred embodiment of my safety rotor.
Figure 11:
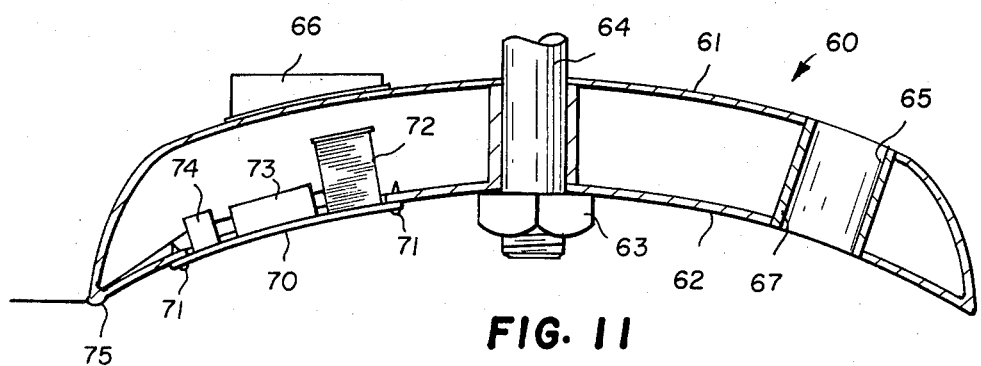
FIG. 11 is a partially schematic, cross-sectional view of the embodiment of FIG. 10, taken along the line 11—11 thereof.

The alternative of FIGs. 10 and 11 illustrates several additional features for my safety rotor. Rotor body 60 has a generally convex top 61 and a concave bottom 62; and although other shapes are possible, the concave bottom 62 reduces friction as the body turns against grass and safely recesses the nut or bolt 63 coupling the rotor to mower shaft 64. Steps or configurations other than smoothly concave can also accomplish this.

Another feature of rotor 60 of FIGS. 10 and 11 is through openings 65 that form air passageways from underside 62 to top side 61. Flexible fins 66, preferably mounted as previously explained, pump air radially outward; and openings 65 allow air to flow upward from the bottom to the top of rotor 60 to join in the radially outward flow. This provides plenty of air giving the mower a vigorous exhaust for blowing grass clippings clear of the mower, and it also tends to straighten up the grass by drawing air upward through rotor 60 so that the grass is upright when cut. It also eliminates any need for holes 53 in the motor deck as previously explained. Openings 65 are preferably formed with bushings or sleeves 67 to keep the interior of rotor 60 closed against dirt, and sleeves 67 can have many different shapes.

Another feature of rotor 60 is mounting and access plates 70 that are secured to the bottom 62 of rotor 60 by screws 71. Plates 70 support spools 72 for filaments 11 and centrifugal feeders 73 and retainers 74 for advancing filaments 11 automatically as explained above relative to FIG. 7. A molding or bushing 75 preferably surrounds an opening through which filament 11 extends at the periphery of rotor 60. To replenish the filament supply on spools 11, mounting plates 70 can be easily removed. Also, there are many other ways that mounting and access plates can be arranged to replenish or service the filament supply.

Many other mechanical alternatives are possible for feeding and retaining strands 11 to extend for a suitable length beyond the perimeter 15 of body 10. Also, spools, pumping fins, and other structures can be varied to achieve the general purpose of a safe rotor made conveniently and economically.

I claim:

1. A safety rotor for a rotary lawn mower having a mower shaft and a blade turned by said shaft to cut a swath equal to the length of said blade, said rotor comprising:
   a. a hollow, generally closed body having a generally smooth exterior;
   b. said hollow body being formed to fit on said mower shaft so said body can be secured to said mower shaft to rotate in place of said blade for said mower;
   c. said body having a circular perimeter with a diameter between 0.5 and 0.9 times said swath of said mower;
   d. a plurality of strands extending radially outward from said perimeter of said body far enough to cut to the full width of said swath;
   e. spools arranged within said body to supply said plurality of strands for feeding radially outward to replenish said strands;
   f. strand control means arranged within said body to be moved by centrifugal force between a first position assumed during slow rotation and a second position assumed during fast rotation; and
   g. said strand control means being arranged for feeding said strands radially outward while moving from said first position to said second position and for moving from said second position to said first position without retracting said strands.

2. The rotor of claim 1 wherein said body has a generally convex upper surface and a generally concave bottom.

3. The rotor of claim 1 including flexible vanes arranged on an upper surface of said body.

4. The rotor of claim 3 wherein said upper surface of said body has openings, and said flexible vanes have snap hooks to secure said vanes in said openings.

5. The rotor of claim 3 wherein said body has through openings allowing air to flow from below to above said body in response to rotary movement of said vanes.

6. The rotor of claim 5 wherein said upper surface of said body has openings, and said flexible vanes have snap hooks to secure said vanes in said openings.

7. The rotor of claim 5 wherein said body has a generally convex upper surface and a generally concave bottom.

8. The rotor of claim 1 including mounts supporting said spools and said strand control means, and means for replaceably securing said mounts to said body.

9. The rotor of claim 1 wherein said strand control means includes strand grippers arranged to release said strands and move radially inward when centrifugal force on said body reduces and to grip said strands and move radially outward when centrifugal force on said body increases to feed said strands radially outward.

10. The rotor of claim 9 including retainer means effective when said centrifugal force on said body reduces to retain said strands against radially inward movement.

11. The rotor of claim 9 including means for adjusting the radial movement of said strand grippers.

12. The rotor of claim 11 including mounts supporting said spools and said holding means, and means for replaceably securing said mounts to said body.

13. The rotor of claim 9 including flexible vanes arranged on an upper surface of said body.

14. The rotor of claim 13 wherein said upper surface of said body has openings, and said flexible vanes have snap hooks to secure said vanes in said openings.

15. The rotor of claim 14 wherein said body has a generally convex upper surface and a generally concave bottom.

16. The rotor of claim 15 wherein said body has through openings allowing air to flow from below to above said body in response to rotary movement of said vanes.

17. The rotor of claim 15 including mounts supporting said spools and said holding means, and means for replaceably securing said mounts to said body.

18. A housing combined with a safety rotor for a rotary lawn mower having a mower shaft and a blade turned by said shaft to cut a swath equal to the length of said blade, said housing and rotor comprising:
   a. said rotor having a hollow, generally closed body having a generally smooth exterior;
   b. said hollow body being formed to fit on said mower shaft so said body can be secured to said mower shaft to rotate in place of said blade for said mower;
   c. said body having a circular perimeter with a diameter between 0.5 and 0.9 times said swath of said mower;
   d. a plurality of strands extending radially outward from said perimeter of said body far enough to cut to the full width of said swath;
   e. spools arranged within said body to supply said plurality of strands for feeding radially outward to replenish said strands;
   f. strand control means arranged within said body to be moved by centrifugal force between a first position assumed during slow rotation and a second position assumed during fast rotation;
   g. said strand control means being arranged for feeding said strands radially outward while moving from said first position to said second position and for moving from said second position to said first position without retracting said strands;
   h. flexible vanes arranged on an upper surface of said body;
   i. said housing having a discharge opening radially outward from said vanes; and
   j. said housing having air inlet openings radially inward from said vanes.

19. The housing of claim 18 wherein said upper surface of said body has openings, and said flexible vanes have snap hooks to secure said vanes in said openings.

20. The housing of claim 19 wherein said body has a generally convex upper surface and a generally concave bottom.

21. The housing of claim 18 wherein the inside surface of said housing has an abrasive coating along the rotational plane of said strands to wear away any excess length of said strands.

22. The housing of claim 21 wherein said upper surface of said body has openings, and said flexible vanes have snap hooks to secure said vanes in said openings.

* * * * *